US010189971B2

(12) United States Patent
Lima et al.

(10) Patent No.: US 10,189,971 B2
(45) Date of Patent: Jan. 29, 2019

(54) FLEXIBLE SHEET, THERMALLY CONDUCTIVE COMPONENT, ELECTRICALLY CONDUCTIVE COMPONENT, ANTISTATIC COMPONENT, HEATING ELEMENT, ELECTROMAGNETIC WAVE SHIELD, AND METHOD OF PRODUCING FLEXIBLE SHEET

(71) Applicant: Lintec of America, Inc., Richardson, TX (US)

(72) Inventors: Marcio D. Lima, Richardson, TX (US); Kanzan Inoue, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 0 days.

(21) Appl. No.: 15/915,608

(22) Filed: Mar. 8, 2018

(65) Prior Publication Data
US 2018/0194920 A1    Jul. 12, 2018

Related U.S. Application Data

(63) Continuation of application No. PCT/US2016/051686, filed on Sep. 14, 2016.

(30) Foreign Application Priority Data

Sep. 14, 2015    (JP) .................................. 2015-180950

(51) Int. Cl.
*B32B 3/28*    (2006.01)
*C08K 3/04*    (2006.01)
(Continued)

(52) U.S. Cl.
CPC ................ *C08K 3/041* (2017.05); *B32B 5/02* (2013.01); *B32B 5/12* (2013.01); *B32B 7/06* (2013.01);
(Continued)

(58) Field of Classification Search
CPC ..... C08K 3/041; C08L 23/0853; C08L 29/14; C08J 5/042; B32B 9/007
(Continued)

(56) References Cited

U.S. PATENT DOCUMENTS 4,258,100 A * 3/1981 Fujitani ................ B23K 35/226
428/316.6
4,301,040 A * 11/1981 Berbeco ................... H01B 1/24
252/511
(Continued)

FOREIGN PATENT DOCUMENTS

CN    102026066 A    4/2011
CN    104125925 A    10/2014
(Continued)

OTHER PUBLICATIONS

Duncan et al., "Techniques for Characterising the Wetting, Coating and Spreading of Adhesives on Surfaces", National Physical Laboratory, Mar. 2005, NPL Report DEPC-MPR-020, Middlesex, UK, 48 pages.
(Continued)

*Primary Examiner* — Jane L Stanley
(74) *Attorney, Agent, or Firm* — Finch & Maloney PLLC

(57) ABSTRACT

A flexible sheet comprising a composite sheet, the composite sheet comprising a binder and an aggregate containing a plurality of carbon nanotubes that is disposed in the binder, wherein the aggregate is formed as a waveform structure travelling along a single direction in a plane of the composite sheet, is provided. The disclosed flexible sheets may be used as thermally conductive components, electrically conductive components, antistatic components, electromagnetic wave shields, and/or heating elements, in addition to other possible uses.

14 Claims, 3 Drawing Sheets

(51) Int. Cl.

| | | |
|---|---|---|
| B32B 5/02 | (2006.01) | |
| B32B 7/12 | (2006.01) | |
| C09J 9/02 | (2006.01) | |
| C09J 7/38 | (2018.01) | |
| C09J 7/22 | (2018.01) | |
| B32B 5/12 | (2006.01) | |
| B32B 7/06 | (2006.01) | |
| B32B 15/14 | (2006.01) | |
| C09J 201/02 | (2006.01) | |
| B32B 9/00 | (2006.01) | |
| B32B 17/10 | (2006.01) | |
| B32B 27/30 | (2006.01) | |
| C08J 5/04 | (2006.01) | |
| C08L 23/08 | (2006.01) | |
| C08L 29/14 | (2006.01) | |
| C08J 7/04 | (2006.01) | |
| C08K 3/08 | (2006.01) | |
| C08J 5/18 | (2006.01) | |
| C08K 7/06 | (2006.01) | |
| B82Y 40/00 | (2011.01) | |
| B32B 9/04 | (2006.01) | |

(52) U.S. Cl.
CPC ............ *B32B 7/12* (2013.01); *B32B 9/007* (2013.01); *B32B 15/14* (2013.01); *B32B 17/10889* (2013.01); *B32B 27/30* (2013.01); *C08J 5/042* (2013.01); *C08J 5/18* (2013.01); *C08J 7/047* (2013.01); *C08K 3/08* (2013.01); *C08L 23/0853* (2013.01); *C08L 29/14* (2013.01); *C09J 7/22* (2018.01); *C09J 7/38* (2018.01); *C09J 9/02* (2013.01); *C09J 201/02* (2013.01); *B32B 9/043* (2013.01); *B32B 17/10788* (2013.01); *B32B 2260/021* (2013.01); *B32B 2260/046* (2013.01); *B32B 2307/202* (2013.01); *B32B 2307/732* (2013.01); *B32B 2307/748* (2013.01); *B32B 2311/18* (2013.01); *B82Y 40/00* (2013.01); *C08J 2383/04* (2013.01); *C08J 2483/04* (2013.01); *C08K 3/04* (2013.01); *C08K 3/042* (2017.05); *C08K 3/045* (2017.05); *C08K 7/06* (2013.01); *C08K 2003/0831* (2013.01); *C08K 2003/0881* (2013.01); *C08K 2201/011* (2013.01); *C09J 2201/16* (2013.01); *C09J 2201/602* (2013.01); *C09J 2201/606* (2013.01); *C09J 2205/10* (2013.01); *C09J 2205/102* (2013.01)

(58) Field of Classification Search
USPC ............................................ 428/411.1
See application file for complete search history.

(56) References Cited

U.S. PATENT DOCUMENTS

| | | | |
|---|---|---|---|
| 4,874,549 A * | 10/1989 | Michalchik | H01B 1/24 252/511 |
| 5,925,275 A | 7/1999 | Lawson et al. | |
| 7,067,328 B2 | 6/2006 | Dubrow et al. | |
| 7,462,498 B2 * | 12/2008 | Mao | B82Y 10/00 438/20 |
| 7,622,314 B2 | 11/2009 | Liang | |
| 7,641,885 B2 | 1/2010 | Liu et al. | |
| 7,648,406 B2 | 1/2010 | Tai et al. | |
| 7,662,467 B2 | 2/2010 | Li et al. | |
| 7,811,149 B2 | 10/2010 | Liu et al. | |
| 7,854,992 B2 | 12/2010 | Fu et al. | |
| 7,947,145 B2 | 5/2011 | Wang et al. | |
| 8,007,617 B2 | 8/2011 | Min et al. | |
| 8,076,829 B2 * | 12/2011 | Chen | H01L 41/193 310/363 |
| 8,084,097 B2 | 12/2011 | Fisher et al. | |
| 8,318,033 B2 | 11/2012 | Fu et al. | |
| 8,351,220 B2 | 1/2013 | Liang et al. | |
| 8,974,960 B2 | 3/2015 | Manthiram et al. | |
| 9,067,791 B2 | 6/2015 | Kim et al. | |
| 9,095,639 B2 | 8/2015 | Ajayan et al. | |
| 2005/0062024 A1 | 3/2005 | Bessette et al. | |
| 2006/0057388 A1 | 3/2006 | Jin et al. | |
| 2008/0245548 A1 | 10/2008 | Fu et al. | |
| 2008/0292840 A1 | 11/2008 | Majumdar et al. | |
| 2009/0047513 A1 | 2/2009 | Lashmore | |
| 2009/0264036 A1 | 10/2009 | Yano et al. | |
| 2010/0003877 A1 | 1/2010 | Fan et al. | |
| 2010/0009267 A1 | 1/2010 | Chase et al. | |
| 2010/0261058 A1 * | 10/2010 | Lopatin | H01M 4/133 429/212 |
| 2010/0296677 A1 * | 11/2010 | Jiang | B82Y 30/00 381/190 |
| 2010/0311866 A1 | 12/2010 | Huang et al. | |
| 2011/0007477 A1 * | 1/2011 | Xu | H01L 23/373 361/718 |
| 2011/0069860 A1 | 3/2011 | Liu et al. | |
| 2011/0160372 A1 | 6/2011 | Youm et al. | |
| 2011/0259518 A1 | 10/2011 | Tojo et al. | |
| 2013/0118682 A1 | 5/2013 | Zeininger | |
| 2013/0171406 A1 * | 7/2013 | Suehiro | B82Y 30/00 428/98 |
| 2013/0341081 A1 | 12/2013 | Liang et al. | |
| 2014/0035708 A1 * | 2/2014 | Athanasiou | F04B 19/006 335/296 |
| 2014/0151111 A1 * | 6/2014 | Shah | H05K 9/009 174/388 |
| 2014/0287641 A1 | 9/2014 | Steiner, III | |
| 2015/0014047 A1 | 1/2015 | Hutchison et al. | |
| 2015/0034859 A1 | 2/2015 | Compton et al. | |
| 2015/0044656 A1 | 2/2015 | Eichhorn et al. | |
| 2015/0118514 A1 | 4/2015 | Zhao et al. | |
| 2015/0140888 A1 | 5/2015 | Lee et al. | |
| 2015/0147573 A1 | 5/2015 | Zhang et al. | |
| 2015/0191636 A1 | 7/2015 | Otaka et al. | |
| 2018/0194101 A1 * | 7/2018 | Lima | B32B 5/02 |

FOREIGN PATENT DOCUMENTS

| | | |
|---|---|---|
| DE | 3146235 | 5/1983 |
| EP | 0342258 | 11/1989 |
| WO | 2005/070656 A2 | 8/2005 |
| WO | 2013/162649 A2 | 10/2013 |
| WO | 2014-089081 | 6/2014 |

OTHER PUBLICATIONS

Munir, et al., "Carbon Nanotube Reinforced Titanium Metal Matrix Composites Prepared by Powder Metallurgy—A Review", Critical Reviews in Solid State and Material Sciences, 0:1-18, Aug. 2014, 19 pages.

Zou, et al, "Carbide-Forming Groups IVB-VIB Metals: A New Territory in the Periodic Table for CVD Growth of Graphene", NANO Letters, American Chemical Society, ACS Publications, May 29, 2014, vol. 14, pp. 3832-3839.

International Preliminary Report on Patentability received for Patent Application No. PCT/US2016/051686, dated Mar. 29, 2018, 7 pages.

International Search Report and Written Opinion received for Patent Application No. PCT/US2016/051686, dated Jan. 9, 2017, 14 pages.

International Preliminary Report on Patentability received for Patent Application No. PCT/US2016/051742, dated Mar. 29, 2018, 9 pages.

International Search Report and Written Opinion received for Patent Application No. PCT/US2016/051742, dated Dec. 19, 2016, 12 pages.

International Preliminary Report on Patentability received for Patent Application No. PCT/US2016/051689, dated Mar. 29, 2018, 8 pages.

(56) References Cited

OTHER PUBLICATIONS

International Search Report and Written Opinion received for Patent Application No. PCT/US2016/051689, dated Jan. 30, 2017, 15 pages.
International Preliminary Report on Patentability received for Patent Application No. PCT/US2016/051672, dated Mar. 29, 2018, 9 pages.
International Search Report and Written Opinion received for Patent Application No. PCT/US2016/051672, dated Dec. 20, 2016, 12 pages.
Non-Final Office Action and Search Report for Taiwan Patent Application No. 105130024, dated Aug. 22, 2017, 11 pages.
Extended European Search Report received for EP Application No. 16847213.2, dated Aug. 8, 2018, 4 pages.
Partial Supplementary European Search Report received for EP Application No. 168472704.1, dated Aug. 8, 2018, 12 pages.
Supplementary European Search Report received for EP Application No. 168472704.1, dated Oct. 29, 2018, 6 pages.

\* cited by examiner

FLEXIBLE SHEET, THERMALLY CONDUCTIVE COMPONENT, ELECTRICALLY CONDUCTIVE COMPONENT, ANTISTATIC COMPONENT, HEATING ELEMENT, ELECTROMAGNETIC WAVE SHIELD, AND METHOD OF PRODUCING FLEXIBLE SHEET

TECHNICAL BACKGROUND

The present application is a continuation application under 35 U.S.C. § 111(a) of PCT Application No. US2016/51686 filed on Sep. 14, 2016, which claims priority to Japanese Patent Application No. 2015-180950 filed on Sep. 14, 2015, all of which are incorporated herein in their entireties.

BACKGROUND

A method of producing a sheet containing carbon nanotubes using a carbon nanotube forest has been performed (for example, refer to Japanese Patent No. 5350635). In this method, for example, a carbon nanotube forest is firstly grown on a substrate surface by a chemical vapor deposition method (CVD) and a carbon nanotube sheet can then be formed by pulling out in a sheet form an edge of the carbon nanotube forest grown on a substrate surface using a jig.

SUMMARY

The present invention relates to a flexible sheet, a thermally conductive component, an electrically conductive component, an antistatic component, a heating element, an electromagnetic wave shield, and a method of producing a flexible sheet.

An aggregate of carbon nanotubes represented by a carbon nanotube sheet may be applied to various sheet-formed products represented by a thermally conductive component, an electrically conductive component, an antistatic component, a heating element, and an electromagnetic wave shield. When such a sheet-formed product is applied, for example, to a wearable device, flexibility enabling bending, stretching or the like may be required. However, when a sheet-formed product is bended or stretched, the aggregate of carbon nanotubes may be broken, or the carbon nanotubes may be separated from each other. When such a phenomenon occurs, the performance of a sheet-formed product will be impaired.

Therefore and in accordance with various embodiments of the subject disclosure, a flexible sheet utilizing an aggregate of carbon nanotubes, in which fracture of an aggregate of carbon nanotubes and separation of carbon nanotubes from each other are suppressed, is disclosed.

The following example embodiments describe some embodiments of the subject disclosure, from which numerous permutations and configurations will be apparent.

Example embodiment 1 is a flexible sheet comprising a composite sheet, the composite sheet comprising a binder and an aggregate containing a plurality of carbon nanotubes that is disposed in the binder, wherein the aggregate is formed as a waveform structure travelling along a single direction in a plane of the composite sheet is provided.

Example embodiment 2 includes the subject matter of example embodiment 1 and further includes a support sheet that supports the composite sheet.

Example embodiment 3 includes the subject matter of example embodiment 2, wherein the support sheet is an elastic sheet.

Example embodiment 4 includes the subject matter of any one of Example embodiments 1-3, wherein the binder comprises a silicone component.

Example embodiment 5 includes the subject matter of any one of example embodiments 1-4, wherein the carbon nanotubes are metallized carbon nanotubes.

Example embodiment 6 is a thermally conductive component that includes the flexible sheet of any one of example embodiments 1-5.

Example embodiment 7 is an electrically conductive component that includes the flexible sheet of any one example embodiments 1-5.

Example embodiment 8 is an antistatic component that includes the flexible sheet of any one of example embodiments 1-5.

Example embodiment 9 is an electromagnetic wave shield that includes the flexible sheet of any one example embodiments 1-5.

Example embodiment 10 is a heating element that includes the flexible sheet of any one of example embodiments 1-5.

Example embodiment 11 is a method of producing a flexible sheet, the method including stretching an elastic sheet, coating an uncured binder on a surface of the elastic sheet in a stretched state, placing a carbon nanotube sheet, in which a plurality of carbon nanotubes are preferentially aligned in one direction, in the uncured binder, such that the preferential alignment direction of the plurality of carbon nanotubes is oriented along the stretching direction of the elastic sheet, releasing the stretched state of the elastic sheet, and curing the uncured binder.

According to the some disclosed embodiments, a flexible sheet utilizing an aggregate of carbon nanotubes, in which fracture of an aggregate of carbon nanotubes and separation of carbon nanotubes from each other are suppressed even when the flexible sheet is bent or stretched, is provided.

According to some disclosed embodiments, a thermally conductive component, an electrically conductive component, an antistatic component, an electromagnetic wave shield, and a heating element, which can suppress impairment of the performance due to bend or stretch while keeping flexibility, is provided.

According to some disclosed embodiments, a method of producing a flexible sheet utilizing an aggregate of carbon nanotubes, in which fracture of an aggregate of carbon nanotubes and separation of carbon nanotubes from each other are suppressed even when the flexible sheet is bent or stretched, is provided.

DETAILED DESCRIPTION

Example embodiments will be described below in detail. Numerical ranges expressed herein by "from x to y" include the values of x and y in the range as the minimum and maximum values, respectively.

Flexible Sheet

Figure 1:
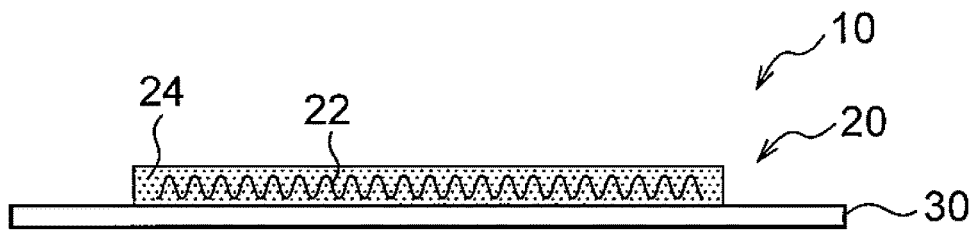
FIG. 1 is a schematic structural view showing a flexible sheet of an example embodiment.
Figure 2:
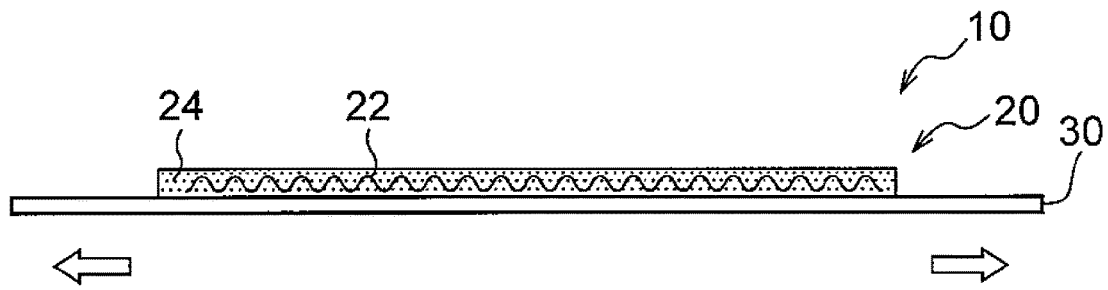
FIG. 2 is a schematic structural view showing a flexible sheet of an example embodiment in a stretched state.

A flexible sheet 10 according to an example embodiment is a sheet-formed component having bendable or stretchable flexibility. More specifically, as shown in FIG. 1, a flexible sheet 10 comprises, for example, a composite sheet 20, in which an aggregate 22 containing a plurality of carbon nanotubes (hereinafter also referred to as "carbon nanotube aggregate") is disposed in a binder 24 and a support sheet 30 supporting the composite sheet 20. In other words, a flexible sheet 10 is, for example, constituted with a layered body, in which the composite sheet 20 is layered on the support sheet 30. In this regard, a flexible sheet 10 may be constituted with a monolayer body of the composite sheet 20.

Composite Sheet

An example composite sheet 20 includes a carbon nanotube aggregate 22 and a binder 24. The carbon nanotube aggregate 22 is formed as a waveform structure travelling along a single direction in a plane of the composite sheet 20. Specifically, for example, the carbon nanotube aggregate 22 may be folded to form a waveform structure so as to orient the wave travelling direction in a single direction along a surface of the composite sheet 20 (a plane orthogonal to the sheet thickness direction). A carbon nanotube aggregate 22 forming a waveform structure is hereinafter also referred to as a "waveform carbon nanotube aggregate").

In other words, in a carbon nanotube aggregate 22, a plurality of carbon nanotubes align unidirectionally contacting each other to form as a whole a sheet-formed aggregate, which is disposed in a composite sheet 20. The carbon nanotube aggregate 22 has a form of waves travelling along a single direction in a plane of the composite sheet 20. In a carbon nanotube aggregate 22 carbon nanotubes are aligned not in a direction orthogonal to the wave travelling direction but in a direction along the wave form. In this regard, a carbon nanotube aggregate 22 may include a carbon nanotube aligned in a direction different from the direction along the wave form. Further, a carbon nanotube aggregate 22 may have a structure other than a waveform structure, such as a linear structure and/or a warped structure. As discussed herein, the expression "a carbon nanotube aggregate 22 forms a waveform structure" means that a carbon nanotube aggregate 22 exhibits a wavy form in which peaks and valleys with different or the same dimensions appear irregularly or periodically.

In a carbon nanotube aggregate 22, carbon nanotubes may be in a bundle form (for example, carbon nanotubes may assemble to form a fibrous structure.). Namely, a carbon nanotube aggregate 22 may contain a bundle of carbon nanotubes. In a case in which a carbon nanotube aggregate 22 contains a bundle of carbon nanotubes, the surface area of a plurality of carbon nanotubes can be reduced compared to a case in which a bundle of carbon nanotubes is not contained. Therefore presence of a bundle of carbon nanotubes in a carbon nanotube aggregate 22 is preferable from a viewpoint of possibility of quick immersion of a carbon nanotube sheet in a coated film of an uncured binder at a placing step of a method of producing a flexible sheet 10 described below. In this regard, a bundle of carbon nanotubes include not only an aggregate of carbon nanotubes aggregated in a bundle form, but also a linear body which is formed with carbon nanotubes in a fibrous form or a ribbon form.

The average diameter of a bundle of carbon nanotubes may be between 1 µm and 300 µm, and in some embodiments is between 3 µm and 150 µm, or between 5 µm and 50 µm. In this regard, an average diameter of a bundle of carbon nanotubes means an average diameter of 10 outer circumferences sampled at random of the bundle.

In a carbon nanotube aggregate 22, a carbon nanotube may be a metallized carbon nanotube. When a carbon nanotube is metallized, for example, the resistance value of a composite sheet 20 can be reduced to about 1/100. By this means a composite sheet 20 comes to have low resistance retaining flexibility. In a case in which carbon nanotubes are in a bundle form, and a carbon nanotube is metallized, carbon nanotubes, which surfaces are metallized, may form a bundle, or a surface of a bundle of carbon nanotubes may be metallized. Further, a surface of a bundle of carbon nanotubes with metallized surfaces may be additionally metallized.

A carbon nanotube is metallized, for example, by forming one, or two or more metallic layers made of a thin film with a thickness of from 5 nm to 500 nm. The metallization may be performed, for example, by vapor deposition, sputtering, or wet plating. Examples of a metal for metallization include elemental metals, such as gold (Au), silver (Ag), copper (Cu), aluminum (Al), zinc (Zn), magnesium (Mg), and iron (Fe), and an alloy containing at least one kind of the elemental metals.

For metallizing a carbon nanotube, a buffer layer such as a titanium (Ti) layer may be formed.

Specific examples of a metallized carbon nanotube include a carbon nanotube, on which surface a titanium layer, and a gold layer or a silver layer are layered one on another in the order mentioned.

A carbon nanotube aggregate 22, which is at least partly in a wave form, is yielded, for example, as follows. Namely, to a carbon nanotube sheet in which a plurality of carbon nanotubes are preferentially aligned in one direction in a plane of the carbon nanotube sheet, a compressive force may be applied from both the ends in the preferential alignment direction toward a central part, so that a carbon nanotube aggregate 22 is at least partly deformed into a wave form.

The content of a carbon nanotube aggregate 22 is, for example, with respect to a composite sheet 20 may be between 10 mass-% and 80 mass-%, or between 15 mass-% and 65 mass-%.

As a binder 24, for example, a material imparting flexibility to a composite sheet 20 may be used. As such a material, for example, an elastic material may be used. Examples of an elastic material include rubber materials, such as a silicone rubber, a urethane rubber, a fluorocarbon rubber, a butyl rubber, a butadiene rubber, an isoprene rubber, a chloroprene rubber, an acrylic rubber, a nitrile rubber, an epichlorohydrin rubber, a styrene-butadiene rubber, an ethylene-propylene rubber, and a natural rubber. Additional examples of an elastic material include resin materials (for example, a thermoplastic elastomer), such as a silicone resin, a fluorocarbon resin, a polyurethane resin, a polystyrene resin, a polyolefin resin, and a polyamide resin.

Further, as a binder 24, a gel prepared by swelling a crosslinkable polymer with a solvent may be used. Such a solvent should preferably have a low solubility parameter, and the crosslinkable polymer should be preferably liposoluble.

A binder 24 may be selected appropriately according to an object, and may be used singly or in combination of 2 or more kinds thereof.

Among others, binder 24 may contain a silicone component, such as a silicone rubber, and a silicone resin. A silicone component may provide flexibility, and also affinity for the carbon nanotubes. Therefore, when a binder containing a silicone component is used, it can easily fill gaps among carbon nanotubes (or a bundle thereof) in a carbon nanotube aggregate 22, the retentivity of carbon nanotubes (or a bundle thereof) by a binder 24 can be enhanced. As the result, the durability of a composite sheet 20 can be improved.

A binder 24 may be formed using any of a material with curing reactivity (e.g. a cold curable or heat curable material, or a material curable by radiation, such as ultraviolet light, and electron beam), a thermoplastic material, and a material soluble in a solvent.

The content of binder 24 may be, for example, with respect to a composite sheet 20 between 20 mass-% and 90 mass-%, or between 35 mass-% and 85 mass-%.

Composite sheet 20 may contain in addition to a carbon nanotube aggregate and a binder 24 a broadly known additive (such as an antioxidant, a UV absorber, a colorant, a filler, an antibacterial agent, and a flame retardant).

The thickness of a composite sheet 20 may be, for example, between 3 µm and 500 µm, or between 10 µm and 300 µm.

Support Sheet

As a support sheet 30, for example, a sheet with flexibility may be used. Therefore, a support sheet 30 may be a sheet-formed component formed, for example, with a material, which is named as an example for a binder 24 of a composite sheet 20. Among them, an elastic sheet 30A formed using an elastic material may be used as a support sheet 30.

Especially, an elastic sheet 30A using the same material as a binder 24 of a composite sheet 20 may be used as a support sheet 30 from a viewpoint of adherence with a composite sheet 20 (suppression of peeling from a composite sheet 20). Specifically, in a case in which a binder 24 of a composite sheet 20 contains a silicone component, an elastic sheet 30A formed using a material containing a silicone component (e.g. a silicone rubber and a silicone resin) may be used as a support sheet 30.

Further, a support sheet 30 may be a monolayer body, or a layered body with a plurality of sheets formed from respectively different materials. In this regard, support sheet 30 may contain an additive (e.g. an antioxidant, a UV absorber, a colorant, a filler, an antibacterial agent, and a flame retardant). The thickness of a support sheet 30 may be, for example, between 10 µm and 3,000 µm, or between 50 µm and 2,000 µm.

Support sheet 30 may be layered not only on one surface of a composite sheet 20, but also on both the surfaces.

Figure 3:
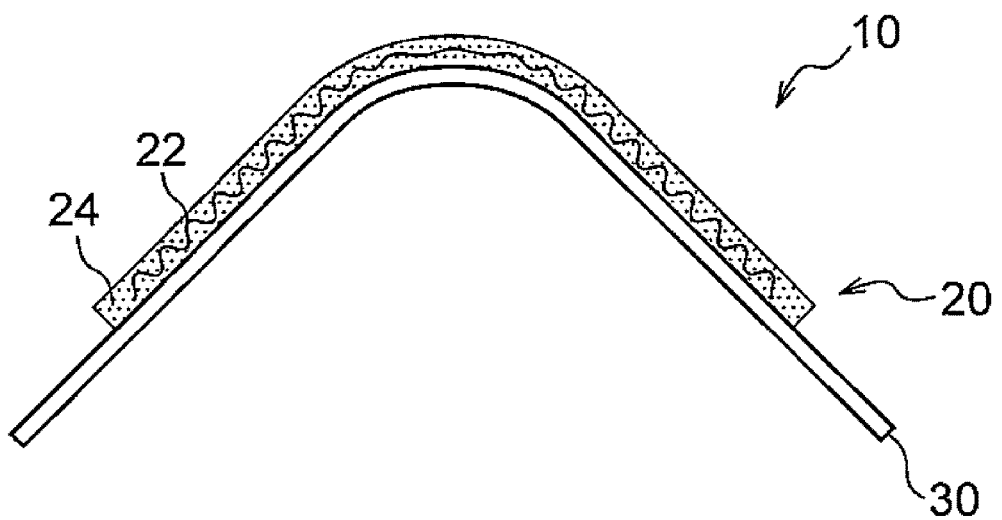
FIG. 3 is a schematic structural view showing a flexible sheet of an example embodiment in a bent state.

Flexible sheet 10 of the present embodiment described above may comprise a composite sheet 20, in which a carbon nanotube aggregate 22 is disposed in a binder 24, and the carbon nanotube aggregate 22 is formed as a waveform structure travelling along a single direction in a plane of the composite sheet. Since a carbon nanotube aggregate 22 may be disposed in a composite sheet 20 in a state folded in a wave form, when a flexible sheet 10 is bent or stretched, a wave-formed carbon nanotube aggregate 22 can be expanded by deformation to a linear or almost linear state (refer to FIG. 3, and FIG. 4). As the result, even when a flexible sheet 10 is bent or stretched, fracture of a carbon nanotube aggregate 22, and separation of carbon nanotubes from each other are suppressed. Namely, in a carbon nanotube aggregate 22, a change in a connection situation among carbon nanotubes is suppressed.

As the result, with respect to various functional components utilizing a flexible sheet 10, impairment of the performance by bending or stretching can be suppressed while maintaining the flexibility.

In examples where flexible sheet 10 comprises additionally a support sheet 30 for supporting a composite sheet 20, the endurance against repeated bending and stretching is improved compared to a case in which a flexible sheet 10 is constituted with a monolayer body of a composite sheet 20. In this case, if an elastic sheet is applied as a support sheet 30, the flexibility of a flexible sheet 10 may be enhanced. Moreover, an elastic sheet to be used at a stretching step in a method of producing a flexible sheet 10 described below may be used as it is as a flexible sheet 10, and in this case there is an advantage that a step of peeling a composite sheet 20 from an elastic sheet can be omitted.

Figure 4:
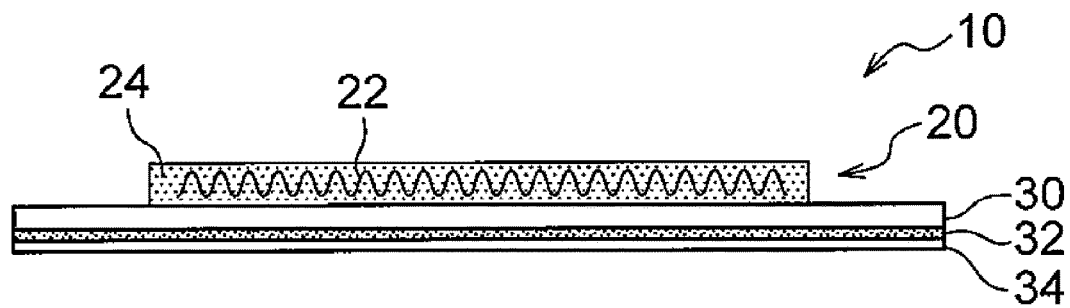
FIG. 4 is a schematic structural view showing another flexible sheet of an example embodiment.

A flexible sheet 10 of the present embodiment may have an adhesive layer 32 as shown in FIG. 4. Adhesive layer 32 may be layered on a surface of either of a composite sheet 20 and a support sheet 30 (a surface opposite to surfaces of the sheets facing each other). When a flexible sheet 10 has an adhesive layer 32, placement of a flexible sheet 10 onto a surface becomes easier.

On a surface of an adhesive layer 32 (a surface opposite to a surface facing a composite sheet 20 or a support sheet 30), a release sheet 34 may be layered.

Method of Producing a Flexible Sheet

A method of producing a flexible sheet 10 of the present embodiment may be a production method, for example, as shown in FIG. 5A to FIG. 5F, comprising stretching an elastic sheet 30A (stretching), coating an uncured binder 24A on a surface of the elastic sheet 30A in a stretched state (coating), a placing a carbon nanotube sheet 22A, in which a plurality of carbon nanotubes are preferentially aligned in one direction, in the uncured binder 24A, such that the preferential alignment direction of the plurality of carbon nanotubes is oriented along the stretching direction of the elastic sheet 30A (placing), releasing the stretched state of the elastic sheet 30A (stretched state-releasing), and curing the uncured binder 24A (curing). The specifics of the disclosed example methods of producing a flexible sheet 10 will be described in detail with reference to drawings.

In the disclosed methods, elastic sheet 30A may be stretched. Specifically, for example, an elastic sheet 30A in an unstretched state is prepared (refer to FIG. 5A). Then, both the ends in one direction in a plane of the elastic sheet 30A in an unstretched state may be held and drawn outward in the plane so as to stretch the elastic sheet 30A (refer to FIG. 5B). In a case in which an elastic sheet 30A is rectangular, both the ends of the elastic sheet 30A in the longitudinal direction may be held and drawn in the longitudinal direction respectively to stretch the elastic sheet 30A. The elastic sheet 30A may be stretched by drawing both the edges of the elastic sheet 30A, or stretched by fixing one of the two ends of the elastic sheet 30A, and drawing the other end. In this regard, as an elastic sheet 30A, the same sheet as the elastic sheet exemplified as a support sheet 30 may be applied.

Elastic sheet 30A may be stretched, for example, at a stretch rate (the length of an elastic sheet in a stretching direction after stretching/the length of an elastic sheet in a stretching direction before stretching) of from 150% to 1000%.

In this regard, along with stretching of a carbon nanotube sheet 22A described below in a direction along which a plurality of carbon nanotubes are preferentially aligned, elastic sheet 30A may be stretched also in a direction orthogonal to the preferentially aligning direction. In a case in which a carbon nanotube sheet 22A is immersed in an uncured binder 24A when an elastic sheet 30A is in a stretched state in the direction orthogonal to the preferentially aligning direction, and then the stretched state is released, the density of carbon nanotubes in the direction orthogonal to the preferentially aligning direction of the carbon nanotube sheet 22A may be increased.

The uncured binder 24A may then be coated on a surface of an elastic sheet 30A while in a stretched state. Specifically, a layer of an uncured binder 24A may be formed by coating an uncured binder 24A on a surface of an elastic sheet 30A in a stretched state utilizing, for example, a broadly known coating method, such as a die coating method, a knife coating method, a roll coating method, a spray coating method, an ink jet method, and a cast coating method (refer to FIG. 5C).

In this regard, an uncured binder 24A means a liquid substance, which becomes a binder 24 after hardening. Specifically, an uncured binder 24A is, for example, a liquid substance containing a material with curing reactivity (e.g. a cold curable or heat curable material, or a material curable by radiation, such as ultraviolet light, and electron beam), a liquid substance of a molten thermoplastic material, and a liquid substance having dissolved a soluble material in a solvent.

Carbon nanotube sheet 22A, in which a plurality of carbon nanotubes are preferentially aligned in one direction, may then be disposed in an uncured binder 24A, such that the preferential alignment direction of the plurality of carbon nanotubes is oriented along the stretching direction of an elastic sheet 30A. Specifically, for example, a carbon nanotube sheet 22A may be immersed in a coated film of an uncured binder 24A formed on an elastic sheet 30A in a stretched state (refer to FIG. 5D).

Immersion of a carbon nanotube sheet 22A may be carried out multiple times (for example, 2 to 300 times). In other words, a plurality of carbon nanotube sheets 22A (for example, 2 to 300 sheets) may be immersed in a layer of an uncured binder 24A to be layered one on another. In this regard, "a state that carbon nanotubes are aligned in one direction in a plane of a sheet" is a state in which the longitudinal axes of carbon nanotubes are oriented parallel to one direction in a plane of a carbon nanotube sheet. Further, "a preferentially aligned state" means that the state of the alignment is dominant. Namely, insofar as a major portion is in the state of the alignment, the longitudinal axes of a part of carbon nanotubes may be not in a state aligned in one direction in a plane of a carbon nanotube sheet.

A carbon nanotube sheet 22A can be formed, for example, by pulling out carbon nanotubes in a sheet form from an edge of a carbon nanotube forest (a grown body of a plurality of carbon nanotubes grown aligning in a vertical direction from a substrate, which is occasionally also referred to as an "array").

In a carbon nanotube sheet 22A, carbon nanotubes may also take a bundle form (for example, a structure of carbon nanotubes assembled in a fibrous form).

A carbon nanotube sheet 22A may be a sheet having received a densification treatment. A "densification treatment" means, for example, a treatment to bundle together carbon nanotubes in a carbon nanotube sheet 22A (to make a plurality of neighboring carbon nanotubes aggregate into a bundle form), or to increase the existing density of carbon nanotubes in the thickness direction.

By applying a densification treatment (preferably, a bundling treatment) to a carbon nanotube sheet 22A, a bundle of carbon nanotubes (for example, a structure of carbon nanotubes assembled in a fibrous form) may be formed. Examples of a densification treatment include bundling by (1) a treatment to expose a carbon nanotube sheet to a vapor of a substance which is liquid at normal temperature, such as water, an alcohol (e.g. ethanol, methanol, and isopropyl alcohol), a ketone (e.g. acetone, and methyl ethyl ketone), and an ester (e.g. ethyl acetate), and (2) a treatment to expose a carbon nanotube sheet to particles (aerosol) of a substance which is liquid at normal temperature.

In a case in which a densification treatment with particles of a substance which is liquid at normal temperature is conducted, the particle size of the substance which is liquid at normal temperature is preferably from 5 nm to 200 μm, more preferably from 7.5 nm to 100 μm, and further preferably from 10 nm to 50 μm.

Carbon nanotube sheet 22A may be a sheet formed by aligning into a sheet form a large number of linear bodies of carbon nanotube sheets in a fibrous form or a ribbon-form. In other words, for a carbon nanotube sheet 22A, a large number of linear bodies of carbon nanotube sheets in a fibrous form or a ribbon-form may be aligned into a sheet form, so as to form a bundle of carbon nanotubes (a structure of carbon nanotubes assembled in a fibrous form).

Carbon nanotube sheet 22A may be a layered body layering a plurality of sheets, for example, produced by pulling-out from a forest. When a carbon nanotube sheet 22A is a layered body, a composite sheet 20 with a low electrical resistance can be obtained. In this case, a carbon nanotube sheet 22A may be a layered body of a plurality of carbon nanotube sheets, which have received a densification treatment, or a layered body obtained by conducting a densification treatment on a layered body layering a plurality of sheets produced by pulling-out from a forest. A carbon nanotube sheet 22A may be a layered body obtained by conducting additionally a densification treatment on a layered body of a plurality of carbon nanotube sheets, which have received a densification treatment. Such layered bodies may be immersed multiple times in a coated film of an uncured binder 24A as described above.

Carbon nanotube sheet 22A may include one or more metallized carbon nanotubes. In this case, a composite sheet 20 including a carbon nanotube aggregate 22 with a metallized tube surface can be obtained.

With respect to metallization of a surface of a carbon nanotube of a carbon nanotube sheet 22A, a forest and a sheet of carbon nanotubes are metallized, for example, in the process of producing a carbon nanotube sheet 22A by pulling out carbon nanotubes in a sheet form from an edge of a carbon nanotube forest. In a case in which a bundle of carbon nanotubes is formed, metallization may be conducted on the bundle of carbon nanotubes.

The thickness of a carbon nanotube sheet 22A may be, for example, between 0.01 μm and 100 μm, or between 0.05 μm and 75 μm.

Figure 5A:
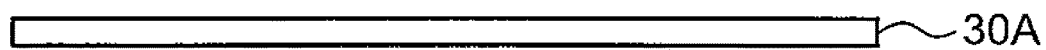
FIG. 5A is a process drawing showing a method of producing a flexible sheet of an example embodiment.
Figure 5B:
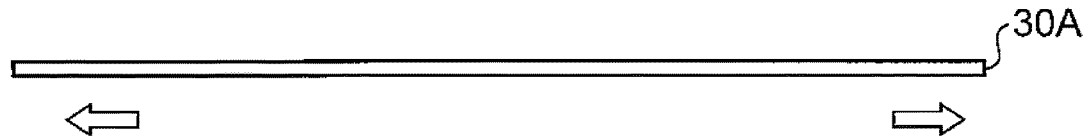
FIG. 5B is a process drawing showing a method of producing a flexible sheet of an example embodiment.
Figure 5C:
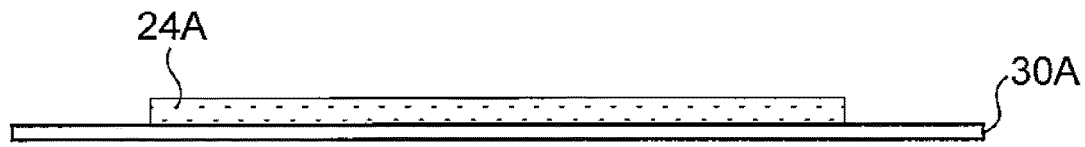
FIG. 5C is a process drawing showing a method of producing a flexible sheet of an example embodiment.
Figure 5D:
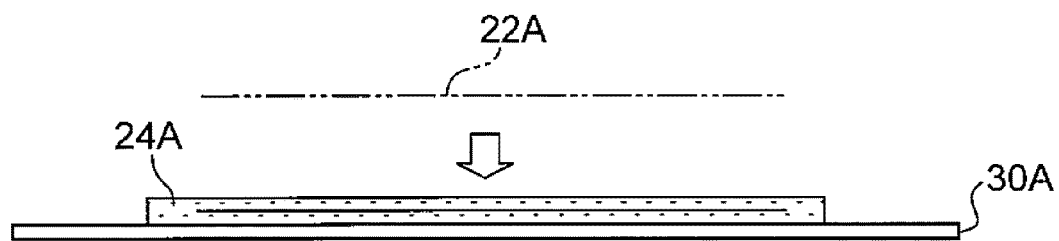
FIG. 5D is a process drawing showing a method of producing a flexible sheet of an example embodiment.
Figure 5E:
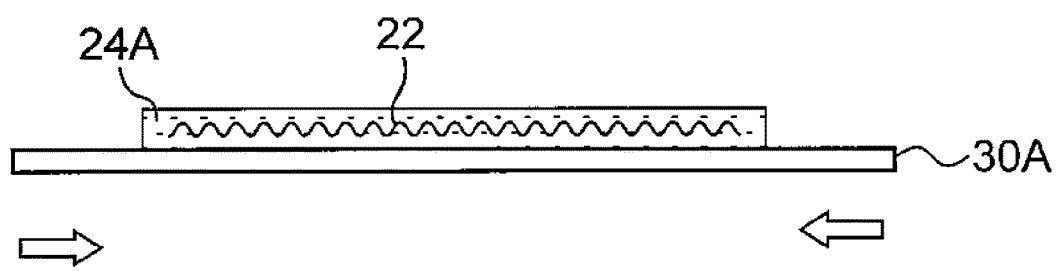
FIG. 5E is a process drawing showing a method of producing a flexible sheet of an example embodiment.

During a stretched state-releasing step a stretched state in an elastic sheet 30A may be released. Specifically, for example, from a state in which an elastic sheet 30A in a stretched condition is held at both the ends in one direction in the plane thereof, which have been drawn outward in the plane, the magnitude of drawing is decreased gradually to release finally the stretched state of the elastic sheet 30A (FIG. 5E). By this means, a compressive force from both the ends in a preferentially aligned direction of carbon nanotubes toward the central part is applied to a carbon nanotube sheet 22A disposed in an uncured binder 24A. Due to the compressive force, at least a part of carbon nanotube sheet 22A is deformed into a wave form. Namely, a carbon nanotube aggregate 22, at least a part of which is in a wave form, may be formed.

Figure 5F:
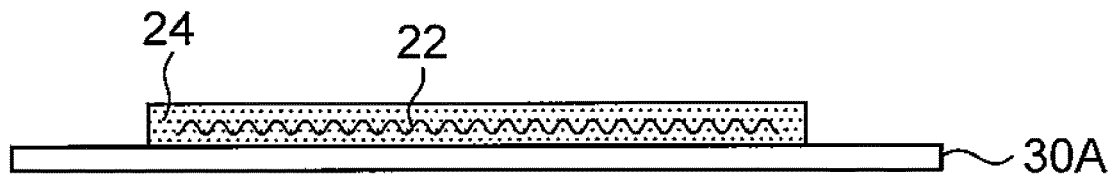
FIG. 5F is a process drawing showing a method of producing a flexible sheet of an example embodiment.

Uncured binder 24A may then be cured. Specifically, for example, a coated film of an uncured binder 24A, in which a carbon nanotube aggregate 22 is disposed at least partly in a wave form, may be hardened (FIG. 5F). In this regard, with respect to hardening of an uncured binder 24A: 1) in a case in which an uncured binder 24A is a liquid substance containing a material with curing reactivity (e.g. a cold curable or heat curable material, or a material curable by radiation, such as ultraviolet light, and electron beam), hardening may be conducted after application of the same by allowing a curing reaction of a material with curing reactivity to advance by leaving the material at normal temperature or applying heat or radiation to the material; 2) in a case in which an uncured binder 24A is "a liquid substance of a molten thermoplastic material", hardening may be conducted by cooling the molten thermoplastic material, and 3) in a case in which an uncured binder 24A is "a liquid substance having dissolved a soluble material in a solvent" hardening is conducted by evaporating the solvent from the liquid substance having dissolved a soluble material in a solvent.

An uncured binder 24A may be hardened as above to form a binder 24, and the binder 24 retains a carbon nanotube aggregate 22 at least partly in a wave form. Consequently, the shape of a wave-formed carbon nanotube can be maintained.

Through the above steps, a composite sheet 20 may be formed on an elastic sheet 30A (FIG. 5F).

Thereafter a composite sheet 20 may be released from an elastic sheet 30A according to need, and a support sheet 30 may be layered on one surface of the composite sheet 20 to yield a flexible sheet 10. In this regard, support sheets 30 may be layered on both sides of a composite sheet 20 to yield a flexible sheet 10.

Alternatively, without releasing a composite sheet 20 from an elastic sheet 30A, a flexible sheet 10 utilizing an elastic sheet 30A as a support sheet 30 may be prepared.

Further, by releasing a composite sheet 20 from an elastic sheet 30A, a flexible sheet 10 constituted with a monolayer body of a composite sheet 20 may be prepared. In this case, a layered body with an elastic sheet 30A and a composite sheet 20 is an intermediate product for producing a flexible sheet 10, and an elastic sheet 30A may be used as a process film for producing a composite sheet 20.

A flexible sheet 10 according to the present disclosure may be used in various applications. For example, flexible sheet 10 may be used as a thermally conductive component, an electrically conductive component, an antistatic component, a heating element, and/or an electromagnetic wave shield. In particular, since carbon nanotubes have a high thermal conductivity, flexible sheet 10 can be used as a thermally conductive component. Since carbon nanotubes have a low resistance, flexible sheet 10 can be used as an electrically conductive component, an antistatic component, and/or an electromagnetic wave shielding material. Especially, when a surface of a carbon nanotube is metallized, and the resistance of a composite sheet 20 is lowered, it may be suitable for an electrically conductive component.

It is possible to make a carbon nanotube have a predetermined resistance, while securing electrical conductivity, so that it can generate heat by supply of electricity. Consequently, flexible sheet 10 can be used as a heating element.

Since fracture of an aggregate of carbon nanotubes and separation of carbon nanotubes from each other are suppressed, even when flexible sheet 10 is bent or stretched, impairment of the performance of functional components (a thermally conductive component, an electrically conductive component, an antistatic component, an electromagnetic wave shield, and/or a heating element) including a flexible sheet 10 by bending or stretching can be suppressed, while maintaining flexibility.

Therefore, such devices that include flexible sheet 10 can be utilized in a device requiring flexibility such as a wearable device. Further, flexible sheet 10 can be utilized in other devices, for example, in which the sheet is disposed on a not-flat surface, such as a curved surface or a concave-convex surface.

EXAMPLES

Some example embodiments will be described more specifically below by way of Examples. It is to be understood that the following Examples do not restrict in any way the scope of the subject disclosure.

Example 1

In Example 1, a silicone rubber sheet with a thickness of 1.6 mm (WESLASTOMER, produced by Western Rubber & Supply, Inc.) was prepared as an elastic sheet. An uncured and cold-curable silicone rubber (SOLARIS, produced by Smooth-On, Inc.) was prepared as an uncured binder.

Next, the elastic sheet was stretched, such that a part of the elastic sheet in a length of 7.5 cm was stretched to a length 350% as long as the initial length. The uncured silicone rubber was coated on the elastic sheet in a stretched state to a thickness of 80 μm. A carbon nanotube sheet pulled out from a carbon nanotube forest was immersed in the coated film of the uncured silicone rubber. The immersion of a carbon nanotube sheet was repeated 100 times to immerse 100 sheets of carbon nanotube sheets in the coated film of the uncured silicone rubber. Thereafter the stretched state of the elastic sheet was released. Then, the elastic sheet with the coated film of the uncured silicone rubber, in which the carbon nanotube sheets were immersed, was stored at room temperature for 12 hours to cure the silicone rubber.

Through this process, a flexible sheet comprising a layered body constituted with a composite sheet, in which a carbon nanotube aggregate was disposed in a silicone rubber, and an elastic sheet (support sheet), was obtained.

Example 2

A metal vapor deposition treatment was conducted on a carbon nanotube sheet pulled out from a carbon nanotube forest to form a Ti layer (Ti buffer layer) with a thickness of 4 nm on a surface of a carbon nanotube, and thereafter to form a Au layer with a thickness of 60 nm on the Ti layer.

A flexible sheet was obtained identically with Example 1 except that a carbon nanotube sheet having received a metallization treatment is used instead of the carbon nanotube sheet in Example 1, provided that immersion of the carbon nanotube sheet was carried out twice to immerse 2 sheets of the carbon nanotube sheets in a coated film of an uncured silicone rubber.

Comparative Example 1

A flexible sheet was obtained identically with Example 1, except that an uncured silicone rubber was coated without conducting stretch and release of stretched state on an elastic sheet as in Example 1.

Evaluation

The following evaluations were conducted with respect to flexible sheets obtained in the respective examples. In Comparative Example 1, in measuring the surface resistance in a stretched state, fracture of a carbon nanotube sheet in a composite sheet occurred at a stretch rate of approx. 10% and the surface resistance in a stretched state resulted in an extremely high value. The results are shown in Table 1.

(Observation on Composite Sheet)

A composite sheet of a flexible sheet was observed under a light microscope to confirm whether or not a carbon nanotube was formed in a waveform structure.

(Surface Resistance of Composite Sheet Before Stretching and in Stretched State)

The surface resistance of a composite sheet before stretching a flexible sheet was measured. Meanwhile, a flexible sheet was stretched at a stretch rate (the length of a flexible sheet in a stretching direction after stretching/the length of a flexible sheet in a stretching direction before stretching) of 250%. The surface resistance of a composite sheet of a flexible sheet was measured in the stretched state.

Meanwhile, a surface resistance of a composite sheet was measured by the following method. Copper tapes ("COPPER COND TAPE ¼ in" produced by 3M Company) were bonded at both the ends of a composite sheet and the copper tape and the composite sheet were connected with a silver paste. Both the ends of the flexible sheet were fixed on 2 sheets of glass substrates respectively. Then the resistance between the copper tapes was measured using a multitester (Non-Contact Voltage Detector, Extech Instruments Corporation), and the surface resistance of a composite sheet was calculated. The surface resistance of a composite sheet in a stretched state was measured by enlarging the distance between the glass substrates to stretch the composite sheet.

TABLE 1

| | Composite sheet of flexible sheet | | |
|---|---|---|---|
| | Carbon nanotube Existence or nonexistence of waveform structure | Surface resistance before stretching | Surface resistance in stretched state |
| Example 1 | existing | 5 Ω/sq. | 5 Ω/sq. |
| Example 2 | existing | 6 Ω/sq. | 6 Ω/sq. |
| Comparative Example 1 | not existing | 5 Ω/sq. | >1,000,000 Ω/sq. |

From the above results, it was confirmed that in a flexible sheet according to the present Example carbon nanotubes contained in a composite sheet were formed in a waveform structure. Further, there was no recognizable change in the surface resistance of a composite sheet between in a flexible sheet before stretching and in a flexible sheet in a stretched state.

In the case of the flexible sheet of Example 2, carbon nanotubes contained in the composite sheet were treated for metallization, and therefore lowering of the surface resistance of the composite sheet could be achieved, although only 2 layers of carbon nanotube sheets were immersed in contrast to the flexible sheet of Example 1.

Meanwhile, in the case of the flexible sheet of Comparative Example 1, it was confirmed that carbon nanotubes contained in the composite sheet were not formed in a waveform structure. Further, there was a significant change in the surface resistance of the composite sheet between in a flexible sheet before stretching and in a flexible sheet in a stretched state. From this result, it was presumed that a connection condition of the carbon nanotubes was changed due to fracture of a carbon nanotube sheet contained in the composite sheet and separation of the carbon nanotubes from each other.

What is claimed is:

1. A flexible sheet comprising a composite sheet, the composite sheet comprising an elastic binder and a carbon nanotube sheet containing a plurality of carbon nanotubes that is disposed in the elastic binder, wherein the carbon nanotube sheet has as a waveform structure with a plurality of peaks and valleys, the waveform structure travelling along a single direction in a plane of the composite sheet to enable the flexible sheet to be stretched in the direction of the waveform structure.

2. The flexible sheet of claim 1, further comprising a support sheet that supports the composite sheet.

3. The flexible sheet of claim 2, wherein the support sheet is an elastic sheet.

4. The flexible sheet of claim 1, wherein the binder comprises a silicone component.

5. The flexible sheet of claim 1, wherein the carbon nanotubes are metallized carbon nanotubes.

6. The flexible sheet of claim 5, wherein the metallized carbon nanotubes comprise a first metal layer of titanium on the carbon nanotubes.

7. The flexible sheet of claim 6, wherein the metallized carbon nanotubes comprise a second metal layer on the first metal layer of titanium.

8. The flexible sheet of claim 1, wherein the carbon nanotube sheet comprises a plurality of carbon nanotube bundles.

9. The flexible sheet of claim 8, wherein a diameter of a bundle of the plurality of carbon nanotube bundles is between 3 μm and 150 μm.

10. A thermally conductive component comprising the flexible sheet of claim 1.

11. An electrically conductive component comprising the flexible sheet of claim 1.

12. An antistatic component comprising the flexible sheet of claim 1.

13. An electromagnetic wave shield comprising the flexible sheet of claim 1.

14. A heating element comprising the flexible sheet of claim 1.

* * * * *